No. 767,880. PATENTED AUG. 16, 1904.
H. FRITZSCHE.
ROLL FILM.
APPLICATION FILED APR. 20, 1904.
NO MODEL.
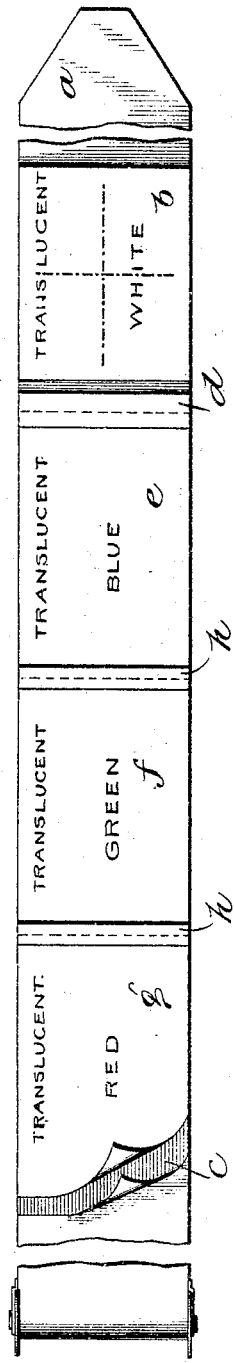
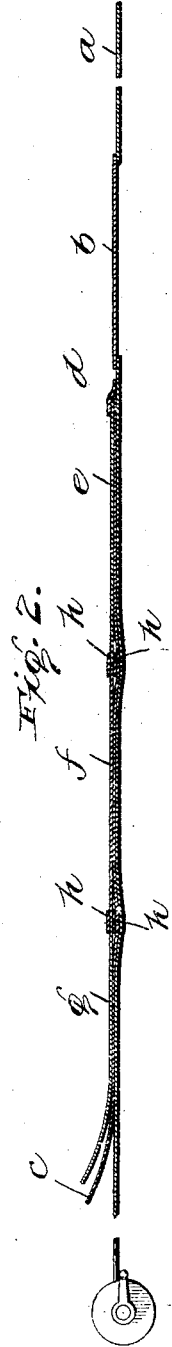
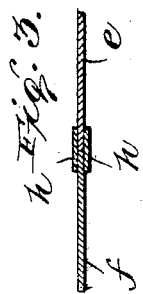
WITNESSES:
INVENTOR
Hugo Fritzsche,
BY
Wilkinson & Fisher,
Attorneys No. 767,880. Patented August 16, 1904.

UNITED STATES PATENT OFFICE.

HUGO FRITZSCHE, OF LEIPZIG, GERMANY.

ROLL-FILM.

SPECIFICATION forming part of Letters Patent No. 767,880, dated August 16, 1904.

Application filed April 20, 1904. Serial No. 204,111. (No specimens.)

*To all whom it may concern:*

Be it known that I, HUGO FRITZSCHE, a subject of the German Emperor, residing at Leipzig, in the Kingdom of Saxony and Empire of Germany, have invented certain new and useful Improvements in Roll-Films; and I do hereby declare the following to be a full, clear, and exact description of the invention, such as will enable others skilled in the art to which it appertains to make and use the same.

My invention relates to improvements in roll-films, more especially roll-films to be used in three-color photography; and the object of my invention is to produce a simple and cheap roll-film and one that can be used over and over again simply by removing the sensitized films on which the pictures have been taken and substituting new films therefor.

In the accompanying drawings, Figure 1 is a plan view of my roll-film partly unrolled. Fig. 2 is a longitudinal section of the same; and Fig. 3 is a cross-section, on an enlarged scale, showing the means for attaching the color-screens to each other.

The whole film is secured upon a roll of the usual construction—such, for example, as is shown in my pending application, Serial No. 149,252.

$a$ represents the backing-strip, made of opaque material. At intervals this strip is interrupted, and translucent focusing-strips $b$, provided with the usual focusing-lines, are attached thereto. It is obvious that instead of the translucent portions $b$ the opaque backing-strip $a$ might be provided with the ordinary oval openings acting as windows. Just to the rear of the focusing portion $b$ is the sensitized film $c$. This film is long enough so that three negatives may be taken thereon and is attached to the opaque backing-strip $a$ on one edge by a fastening $d$. On the opposite side of the sensitized strip $c$ from the opaque backing is the color-screen, composed of three portions $e$, $f$, and $g$, which are blue, green, and red, respectively, these being the three colors most suitable for multicolor photography. This color-screen of course is translucent; but each section thereof allows only certain kinds of rays of light to pass through. The color-screens are united at their abutting edges by strips $h$, pasted thereon, and the color-screen is secured on one edge thereof only to the backing-strip $a$ by means of the strip $d$. Any suitable material may of course be used for the color-screens. The remainder of the film is merely a duplicate of the parts already described.

In operation three separate negatives are taken upon one sensitized strip $c$ of the same object and the picture produced according to the well-known methods of multicolor photography. After the sensitized films in a roll have been exhausted the roll may be used over again by fastening new sensitized strips between the color-screens and the opaque backing, which can be easily done.

Having thus described my invention, what I claim as new, and desire to secure by Letters Patent of the United States, is—

1. In a roll-film, the combination of an opaque backing-strip, a multicolor-screen secured to said strip, and a sensitized film located between said screen and said opaque strip, substantially as described.

2. In a roll-film, the combination of an opaque backing provided with focusing means, a sensitized film secured to said backing, and a multicolor-screen secured to said backing-strip, and so located as to cover said sensitized film, substantially as described.

3. In a roll-film, the combination of an opaque backing-strip, translucent focusing portions in said backing-strip, a sensitized film long enough to take a plurality of negatives, said film being secured at one edge to said backing-strip, and a multicolor-screen secured at one end to said backing-strip and arranged to cover said sensitized film, substantially as described.

In testimony whereof I affix my signature in presence of two witnesses.

HUGO FRITZSCHE.

Witnesses:
RUDOLPH FRICKE,
SOUTHARD P. WARNER.